United States Patent
Guerra et al.

(10) Patent No.: US 12,216,885 B2
(45) Date of Patent: Feb. 4, 2025

(54) DYNAMICALLY CONFIGURED QUICK ACTIONS IN A SIDEBAR

(71) Applicant: Microsoft Technology Licensing, LLC, Redmond, WA (US)

(72) Inventors: Taylor Alexis Guerra, Seattle, WA (US); Lia Johansen, Kirkland, WA (US); Kyle Matthew Miller, Lynnwood, WA (US); Jianjun Yan, Beijing (CN); Yu He, Beijing (CN); Yang Huangfu, Jingsu (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/356,795

(22) Filed: Jul. 21, 2023

(65) Prior Publication Data

US 2025/0004609 A1 Jan. 2, 2025

(30) Foreign Application Priority Data

Jun. 30, 2023 (CN) .......................... 202310799526.X

(51) Int. Cl.
*G06F 3/048* (2013.01)
*G06F 3/0482* (2013.01)
*G06F 9/451* (2018.01)

(52) U.S. Cl.
CPC ............ *G06F 3/0482* (2013.01); *G06F 9/451* (2018.02); *G06F 2203/04803* (2013.01)

(58) Field of Classification Search
CPC .................. G06F 3/0482; G06F 9/451; G06F 2203/04803
See application file for complete search history.

(56) References Cited

U.S. PATENT DOCUMENTS

| | | | |
|---|---|---|---|
| 7,680,546 B2 * | 3/2010 | Gilbert | G06Q 50/04 700/83 |
| 8,255,824 B2 | 8/2012 | Selig | |
| 9,645,709 B2 * | 5/2017 | Foss | G06F 3/0483 |
| 10,386,960 B1 * | 8/2019 | Smith | G06F 3/0412 |
| 10,656,757 B1 * | 5/2020 | Smith | G06F 3/013 |
| 10,656,758 B1 * | 5/2020 | Smith | G06F 3/04883 |
| 10,838,542 B1 * | 11/2020 | Smith | G06F 3/013 |
| 11,914,419 B2 * | 2/2024 | Sepulveda | G06F 3/016 |
| 2013/0268837 A1 | 10/2013 | Braithwaite et al. | |
| 2014/0229898 A1 | 8/2014 | Terwedo | |

(Continued)

OTHER PUBLICATIONS

International Search Report and Written Opinion received for PCT Application No. PCT/US2024/033488, mailed on Oct. 4, 2024, 13 pages.

*Primary Examiner* — David Phantana-angkool

(57) ABSTRACT

Systems and methods for generating dynamic quick actions for an application in a web browser. The dynamic quick actions correspond to various functions of an application accessible via a web browser sidebar interface. When a hover event is detected in association with an icon of the application, a quick-actions card is generated that includes quick actions of the application from which the user can select. For instance, a selection of a quick action triggers the web browser to execute an action that causes the application function to be performed. Thus, application functions are able to be surfaced and controlled via a single input device selection (e.g., a mouse click).

20 Claims, 10 Drawing Sheets

(56) References Cited

U.S. PATENT DOCUMENTS

| | | | |
|---|---|---|---|
| 2014/0279043 A1* | 9/2014 | Yi | G06F 16/972 |
| | | | 705/14.66 |
| 2014/0281858 A1* | 9/2014 | Yi | G06F 40/134 |
| | | | 715/205 |
| 2015/0143248 A1* | 5/2015 | Beechuk | G06F 3/0482 |
| | | | 715/739 |
| 2015/0338915 A1* | 11/2015 | Publicover | G06F 3/0304 |
| | | | 345/633 |
| 2016/0259497 A1* | 9/2016 | Foss | G06F 3/0488 |
| 2017/0255192 A1* | 9/2017 | Thwaites | E21B 34/16 |
| 2018/0082460 A1* | 3/2018 | Xing | G06T 13/80 |
| 2018/0293308 A1* | 10/2018 | Miller | G06F 16/358 |
| 2019/0197758 A1* | 6/2019 | Kaufman | G06F 3/04845 |
| 2019/0302973 A1 | 10/2019 | Lo | |
| 2021/0042724 A1* | 2/2021 | Rathod | G07G 1/0054 |
| 2021/0081082 A1* | 3/2021 | Dascola | H04L 67/60 |
| 2022/0121349 A1* | 4/2022 | Dellinger | G06F 3/04842 |
| 2023/0251766 A1* | 8/2023 | Bull | G06F 3/0482 |
| | | | 715/738 |
| 2023/0403249 A1* | 12/2023 | Hassan | H04L 51/216 |

\* cited by examiner

DYNAMICALLY CONFIGURED QUICK ACTIONS IN A SIDEBAR

CROSS-REFERENCE TO RELATED APPLICATIONS

This application claims the benefit of Chinese Application No. 202310799526.X filed on Jun. 30, 2023, which is incorporated herein by reference in its entirety. To the extent appropriate a claim of priority is made.

BACKGROUND

Applications are designed to help users perform various tasks and present user interfaces with which an application user interacts. Access to functions that such applications can perform may be difficult to identify or locate. For instance, access to functions of an application may be located within a menu or other hierarchical structure that oftentimes requires multiple user interactions (e.g., mouse clicks, touch gestures, voice commands) to access. Requiring multiple user interactions to access an application function can increase the time to complete a task and can further hinder discoverability of the application function, which can limit utilization of the function and operability of the application.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The present technology relates to systems and methods that dynamically generate quick actions for an application that operate as shortcuts to actions performed in the application from a web browser interface. In some examples, the quick actions correspond to common application functions, such as creating a new document, controlling a media player, etc. In further examples, the quick actions are dynamic and may change depending on specific application data (e.g., live data) or other conditions. For instance, a quick action may correspond to a last-accessed document, a recently received communication, a calendar invitation, status of play of a media item, etc. The quick actions are presented in a quick-actions card that is displayed in response to a hover event of an icon of the application. In an example implementation, the icon is included in a sidebar displayed on a side of the web browser interface.

The quick-actions card may be dynamically generated and surfaced based on moving and pausing a cursor on the application icon. For instance, a "click" selection via an input device is not required to trigger a display of the quick-actions card. Thus, users are provided the ability to select a desired quick action via a single "click" selection to invoke a desired application action. The quick actions provide efficient accessibility to particular application functions through a sidebar interface while limiting potential occluding effects that would otherwise hinder interaction with the web browser.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Figure 1:
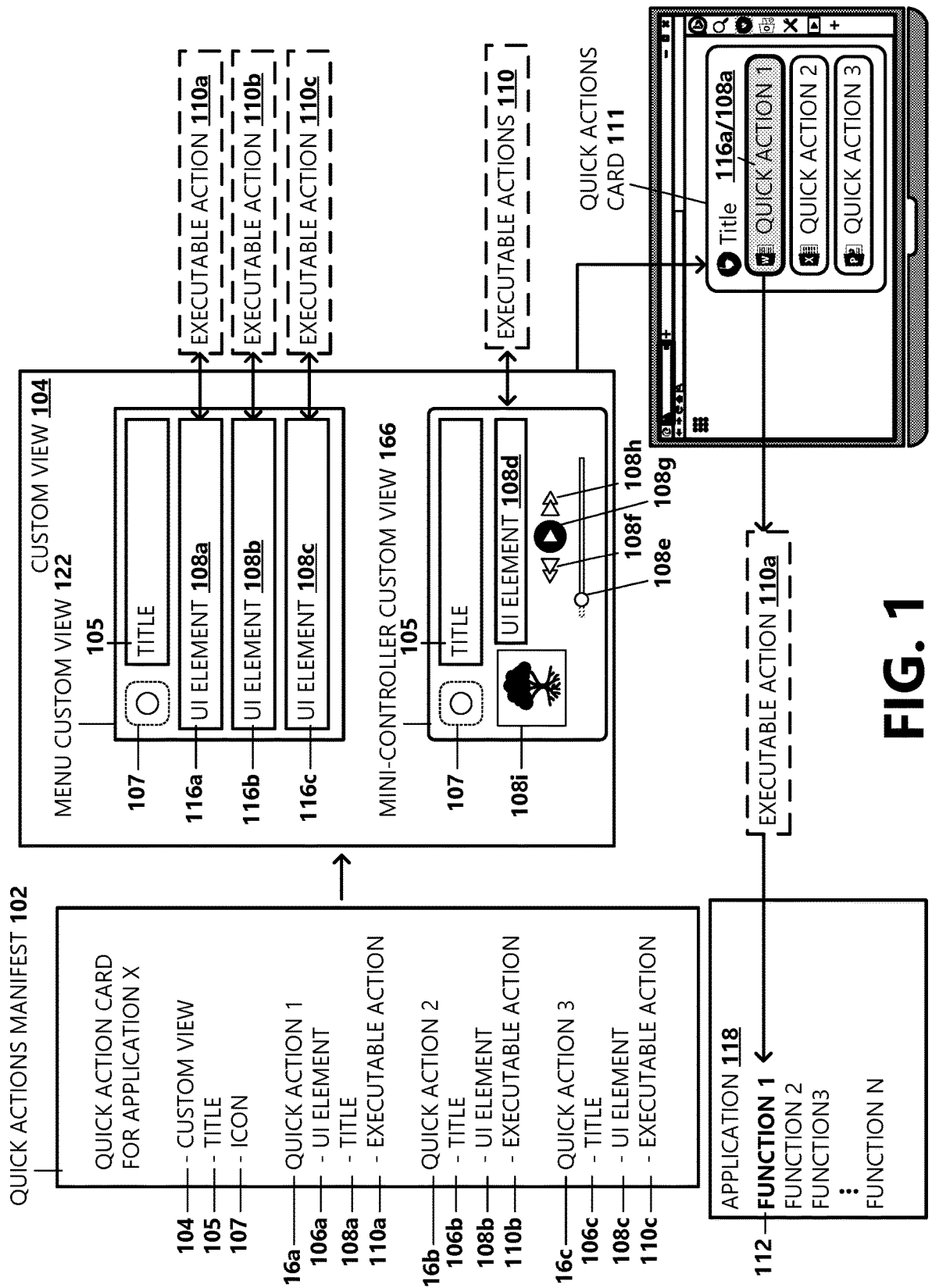
FIG. 1 is a diagram of example components used to dynamically generate quick actions for an application for display in a quick-actions card in accordance with examples of the present disclosure.

The following detailed description refers to the accompanying drawings. Wherever possible, the same reference numbers are used in the drawing and the following description to refer to the same or similar elements. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the technology, but instead, the proper scope of the technology is defined by the appended claims. Examples may take the form of a hardware implementation, or an entirely software implementation, or an implementation combining software and hardware aspects. The following detailed description is, therefore, not to be taken in a limiting sense.

In an example implementation, a web browser includes a framework that exposes web-based applications (referred to herein as "applications") that launch within the web browser. The framework provides a sidebar interface (referred to herein as a "sidebar") in which icons corresponding to the applications are displayed. Typically, a user can select an icon to open the corresponding application in the web browser and then select a desired application function located within a menu in an application interface. That is, accessing the desired function of the application requires multiple user interactions to access. For instance, if the user is using a mouse as an input device, to access a particular application function, the user may first click the icon of the application to open the application, then click through a hierarchical menu to access the desired function.

As discussed above, this can limit the ability to fully explore and utilize capabilities of an application and lead to underutilization of various application features. Additionally, requiring multiple user interactions to access an application function can increase the processing resources required to complete the task. For instance, each user interaction requires additional processor and display cycles. The requirement of multiple interactions also can also reduce the interaction performance, making the overall user experience less efficient, which can be problematic for repetitive and/or time-sensitive tasks. Further, user frustration can arise from a perceived inefficiency and/or extra effort required to complete a task, which can negatively impact user satisfaction and lead to decreased usage of the application. Moreover, excessive user interactions can present challenges for users with disabilities or impairments. For instance, users who have motor skill limitations or visual impairments may have difficulty navigating multiple user interactions.

Examples described in this disclosure relate to a quick actions controller that provides dynamic quick actions corresponding to various application functions in a quick-actions card. In an example implementation, when an on-screen cursor (e.g., controlled by the user via an input device or touch screen) is detected hovering or pausing on an icon displayed in the sidebar (or a long press), the quick actions controller generates a quick-actions card that includes quick actions of an application corresponding to the hovered-on icon from which the user can select. The quick actions are selectable. A selection of a quick action triggers the web browser to handle an action (herein referred to as an executable action) linked to the selected quick action, wherein handling the action causes the application function to be performed.

With reference now to FIG. 1, in examples, executable actions 110a-110c (collectively, executable actions 110) for a set of quick actions 116a-116c (collectively, quick actions 116) are defined for an application 118 in a quick-actions manifest 102 provided by a provider of the application 118 and stored on a server. When the quick actions controller generates a quick-actions card 111 for the application 118, the quick-actions manifest 102 corresponding to the application 118 is obtained from the server and processed. For instance, the quick actions controller links configuration information defined in the quick-actions manifest 102 to user interface (UI) elements 108a-108i (collectively, UI elements 108) and other placeholders included in a custom view 104 of a quick-actions card 111. Example configuration information may define a type of custom view 104 (e.g., a menu custom view 122 or a mini-controller custom view 166), a title 105 and icon 107 to display in the quick-actions card 111, and one or more quick actions 116. For each quick action 116, the quick-actions manifest 102 may define various configuration properties of the quick action 116, including such properties as a type of UI element 108 (e.g., button, slider, toggle switch, label, progress indicator, icon, status indicator) provided in the defined custom view 104 to represent the quick action 116, a title 106a-106c (collectively, title 106), if applicable, to display in association with the UI element 108, and an executable action 110a-110c (collectively, executable action 110) to bind to the UI element 108. For instance, a selection of a quick action 116 triggers the executable action 110 linked to the selected quick action 116, where handling the executable action 110 causes an application function 112 to be performed.

In examples, the quick actions 116 are configurable by the application provider. For instance, updates for quick actions 116 are pushed to the server and obtained by the quick actions controller to generate quick actions 116 that reflect the updates. The quick actions 116 enable the user to easily discover application functions 112 and accomplish tasks via the use of such functions 112 in a quick, intuitive, and efficient manner.

Figure 2A:
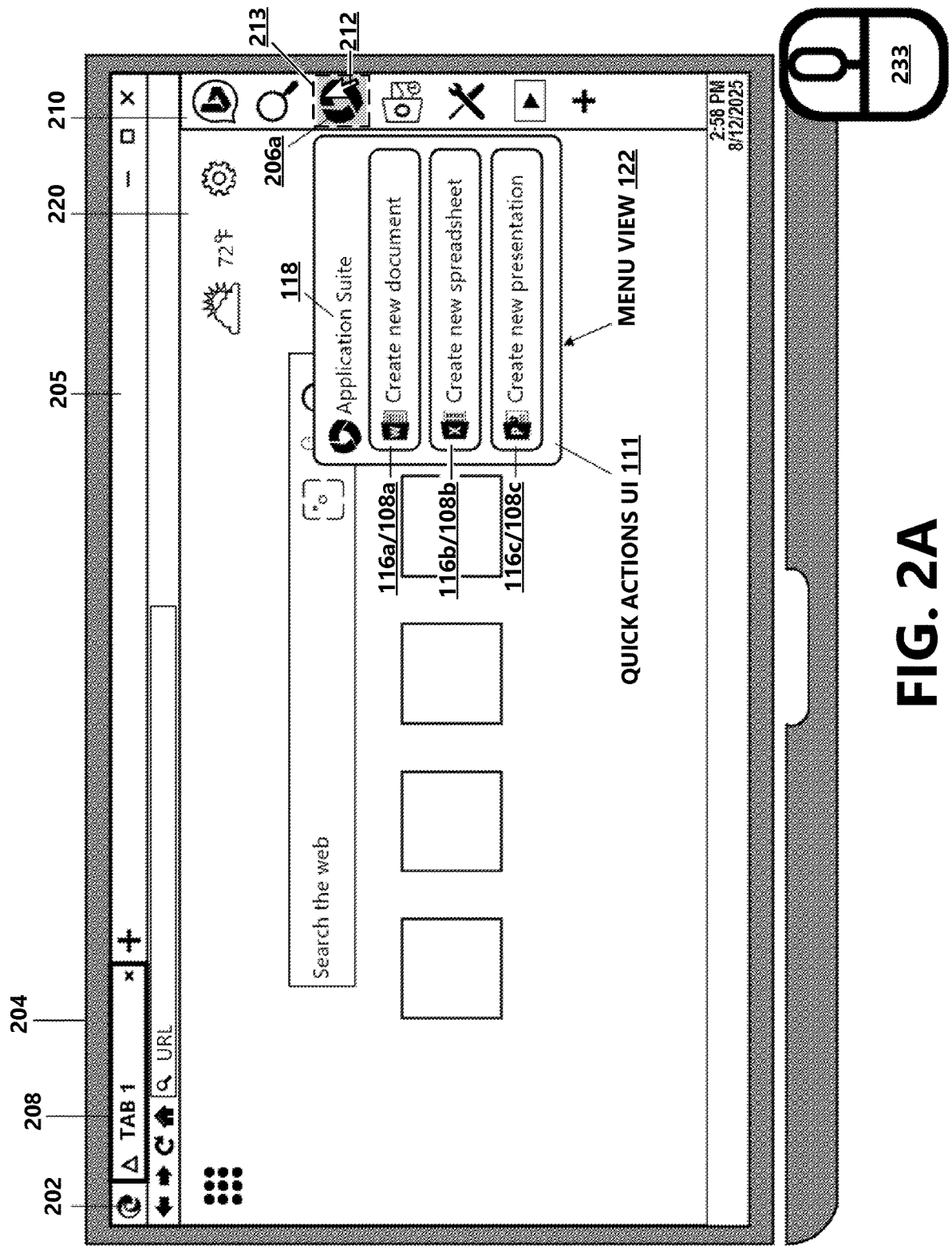
FIG. 2A is an illustration of a first example quick-actions card including quick actions for an application in accordance with examples of the present disclosure.

With reference now to FIG. 2A, an example quick-actions card 111 is depicted. For instance, the quick-actions card 111 includes a plurality of quick actions 116a-116c (collectively, quick actions 116) for an application 118 that launches within a web browser 202. The quick actions 116 provide users quick accessibility to an application's functions 112 within the web browser 202. The web browser 202 is executed on a client computing device 204 and allows users to access and view websites and webpages via one or more networks. The web browser 202 provides a UI (web browser UI 205) displayed on a screen 208 of the client computing device 204. The web browser UI 205 includes various features of the web browser 202 and enables users to navigate through different websites, interact with web-based applications (e.g., applications 118), perform tasks, access various types of content, such as text, images, videos, etc., communicate information, manipulate data, etc.

As shown in FIG. 2A, the web browser UI 205 includes a primary display area 220 and a sidebar 210. For example, the web browser 202 displays a webpage in the primary display area 220 and the sidebar 210 is located on one side of the primary display area 220. Although depicted as located on the righthand side of the primary display area 220, in other examples, the sidebar 210 is located along another side (e.g., lefthand side, top, or bottom) of the primary display area 220. In examples, the sidebar 210 provides application icons 206a-206c (collectively, icons 206) corresponding to the applications 118. For instance, the applications 118 are associated with remote services executing on one or more remote web servers. In an example, the applications 118 include one or a suite of productivity applications (e.g., word processing applications, spreadsheet applications, presentation applications, communication applications, notes applications), games, media player applications, and/or other types of applications. In some examples, when a selection (e.g., a mouse click, a tap) of an application icon 206 is received, a sidebar pane is activated and extends from the sidebar 210. The sidebar pane displays content associated with the selected application 118 side-by-side content displayed in the primary display area 220. An example sidebar pane is depicted in FIG. 2E and described below with reference to FIG. 2E.

In examples, a user interacts with the web browser 202 and applications 118 using an input device 233 to move a cursor 212 displayed on the screen 208 of the client computing device 204. The input device 233 is further used to interact with and make selections of UI elements included in the web browser UI 205 and application UIs. Some example input devices 233 include a mouse, pen, stylus, touchpad, touchscreen, microphone, optical/magnetic sensor, gamepad, joystick, keyboard, etc. According to examples, selections of UI elements are made using the input device 233, such as by the user clicking a mouse button, tapping a touchscreen, pressing a key, etc., to indicate their selection. For instance, a mouse click, a screen tap, a key press, etc., received via the input device 233 triggers a selection event.

According to examples, the user may use the input device 233 to hover or pause the cursor 212 (e.g., a mouse cursor) over a UI element without performing a click or pressing a key. For instance, a hover event is triggered when the cursor 212 enters the boundaries of the UI element and a time threshold is met. In some examples, the input device 233 may not have a hover capability and an alternative interaction (a press and hold action on a UI element on a touchscreen) is detected as a hover event.

As depicted in FIG. 2A, a first hover event is detected in association with an application icon 206, and a quick-actions card 111 for the application 118 corresponding to the application icon 206 is generated and displayed. In some examples, the quick-actions card 111 expands from the sidebar 210 proximate to the application icon 206. For instance, when the user hovers or pauses the cursor 212 within boundaries 213 of the application icon 206, a set of quick actions 116 corresponding to the selected application 118 is populated into the quick-actions card 111, where the quick actions 116 are linked to executable actions 110 and handled by the web browser 202 to cause the application 118 to perform application functions 112.

One example type of executable action 110 is a redirection uniform resource locator (e.g., URL) action. In an example, the redirection URL action includes executable code or instructions that, when executed or performed, drives the web browser 202 to navigate to a webpage having a web address (e.g., URL) specified in the code. Another type of executable action 110 is an event action, where the event action includes executable code or instructions that, when executed or performed, drives the web browser 202 to perform operations that trigger an event handled by the application 118. In some examples, the code or instructions, when executed, cause the browser to construct a call to an application programming interface (API) that interacts with the application 118 to perform a function. For instance, a "wake up desktop application" action event bound to a quick action 116 may include executable code or instructions that cause the web browser 202 to trigger an operation in the application 118 to wake up (e.g., activate or reactivate). Additionally, a "play media" action event also bound to the quick action 116 may include executable code or instructions that cause the web browser 202 to trigger an operation in the application 118 to perform a desired application function 112 of initiating play of a media item.

Quick actions 116 may be pre-defined or custom-configured for an application 118. As an example, quick actions 116 for a word processing application 118 may correspond to creating a new word processing document, opening an existing word processing document, or another word processing application function 112, etc., while quick actions 116 for a communications application 118 may correspond to different functions 112 offered by the communications application 118, such as creating a new message, responding to a message, creating a new event, or another communications or scheduling function 112. In response to a selection event of a quick action 116 presented in a quick-actions card 111, the web browser 202 executes the corresponding executable action (e.g., URL action or event action). In further examples, the user uses the input device 233 to move the cursor 212 outside the boundaries 213 of an application icon 206 or the quick-actions card 111, which when detected, closes the quick-actions card 111 and removes the quick actions 116 from display.

The example quick-actions card 111 in FIG. 2A is depicted in a menu custom view 122, where a set of quick actions 116 is presented as a list of selectable options (e.g., UI elements 108). In examples, the menu custom view 122 is typically used in association with presenting quick actions 116 for productivity applications 118. In the depicted example, the application 118 corresponding to the first hovered icon 206a is an application suite of productivity applications, and the quick actions 116 included in the quick-actions card 111 include a first quick action 116a corresponding to an executable action 110 for a first productivity application of the application suite (e.g., creating a new document in a word processing application), a second quick action 116b corresponding to an executable action 110 for a second productivity application of the application suite (e.g., creating a new spreadsheet in a spreadsheet application), and a third quick action 116c corresponding to an executable action 110 or a third productivity application of the application suite (e.g., creating a new presentation in a presentation application).

Figure 2B:
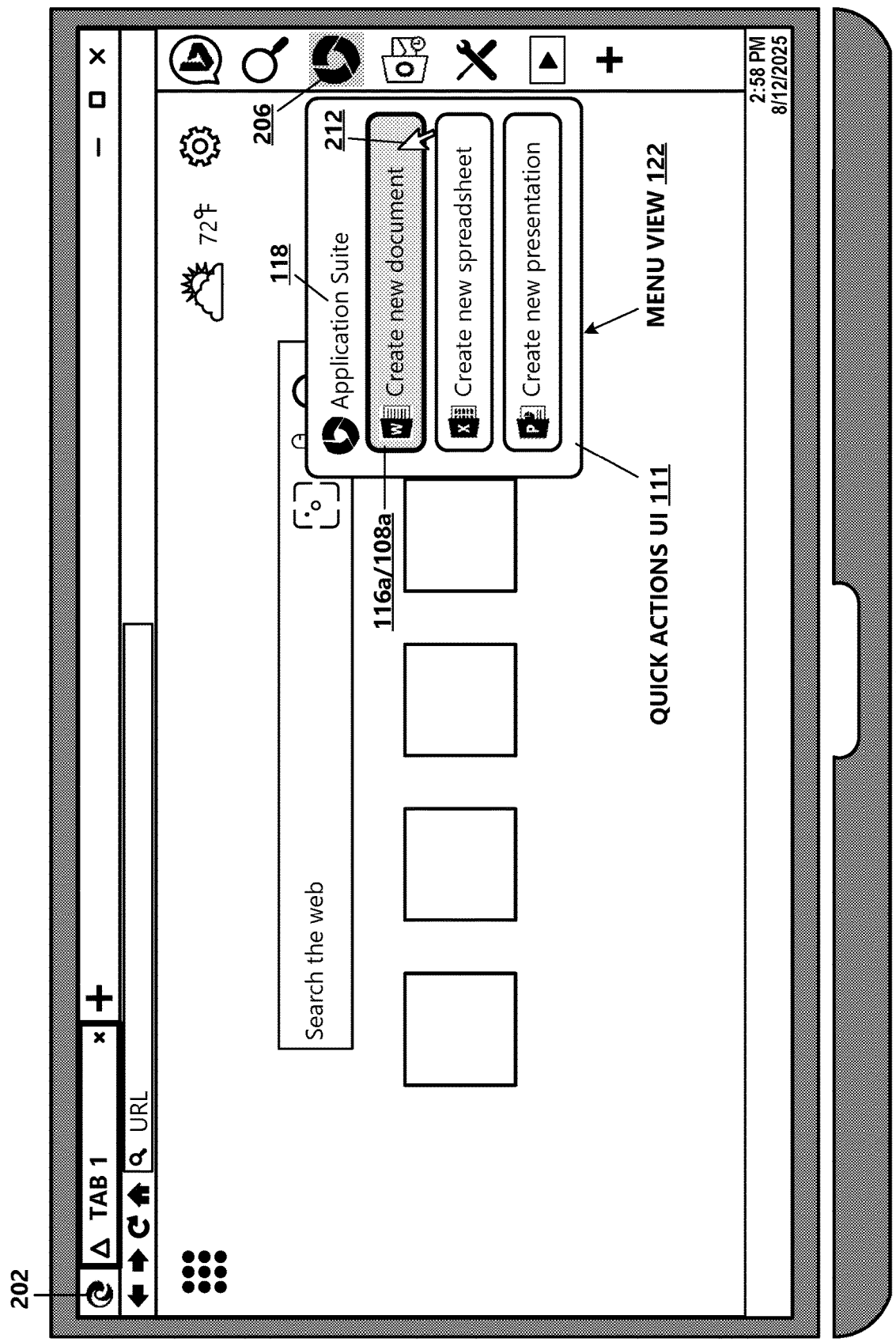
FIG. 2B is an illustration depicting a selection of a first quick action from the first example quick-actions card of FIG. 2A in accordance with examples of the present disclosure.
Figure 2C:
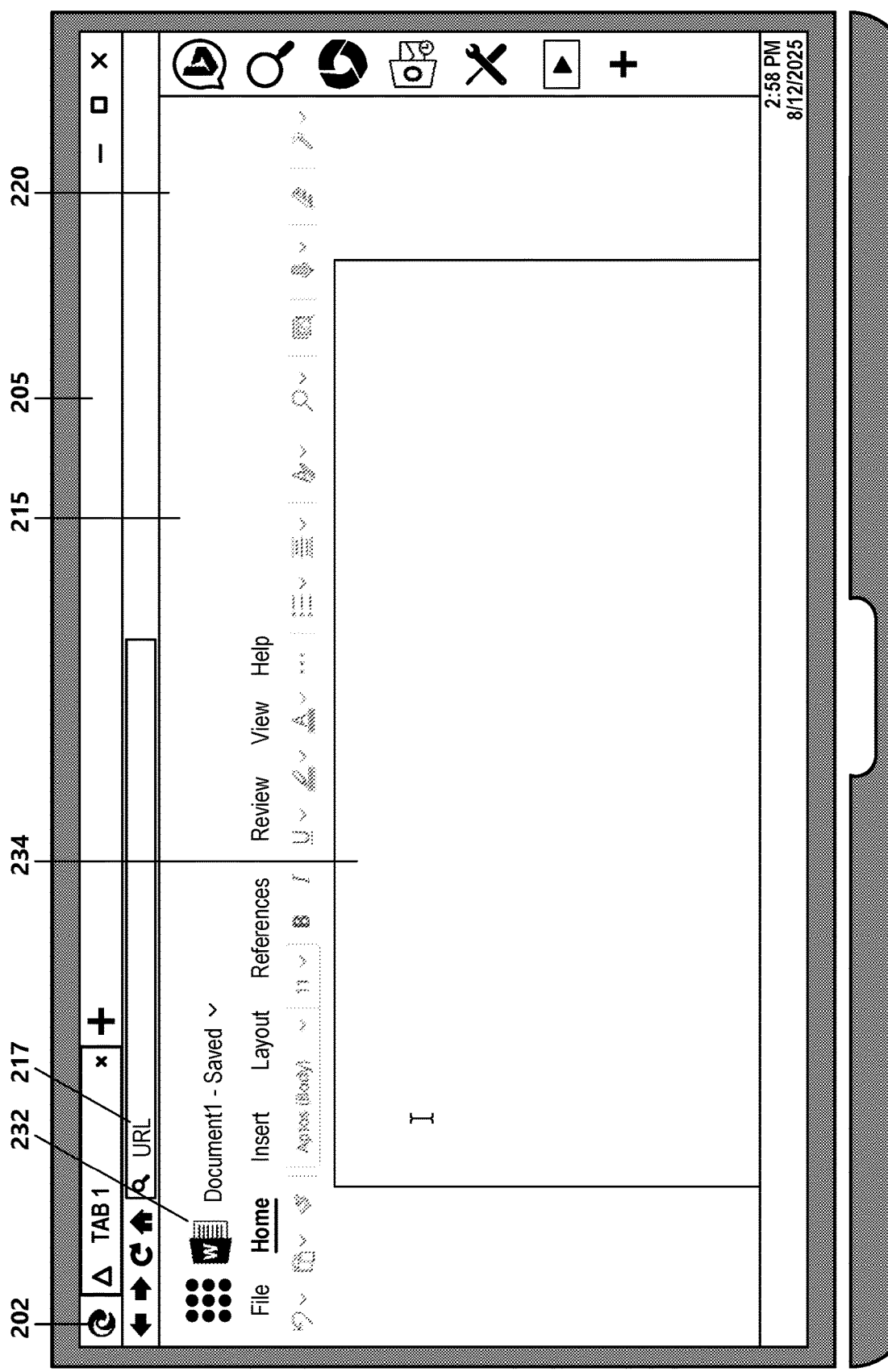
FIG. 2C is an illustration depicting an example action performed in response to the selection of the first quick action in FIG. 2B in accordance with examples of the present disclosure.

With reference now to FIG. 2B, an example user selection of the first quick action 116a presented in the quick-actions card 111 is depicted. For instance, the user moves the on-screen cursor 212 within boundaries of the first quick action 116a and clicks on or otherwise selects the first quick action 116a. When the first quick action 116a is bound to a URL action, in response to the selection, the web browser 202 redirects to a webpage corresponding to a specified URL. As an example, and with reference now to FIG. 2C, the URL 217 corresponds to a webpage of the first application (e.g., a word processing application 232) of the productivity application suite associated with the first quick action 116a. For instance, the webpage corresponding to the URL 217 serves a UI of the word processing application 232 (web processing application UI 215), which is displayed in the primary display area 220 of the web browser UI 205. In an example, the URL may further serve a new word processing document 234, which is then displayed in the word processing application UI 215.

Figure 2D:
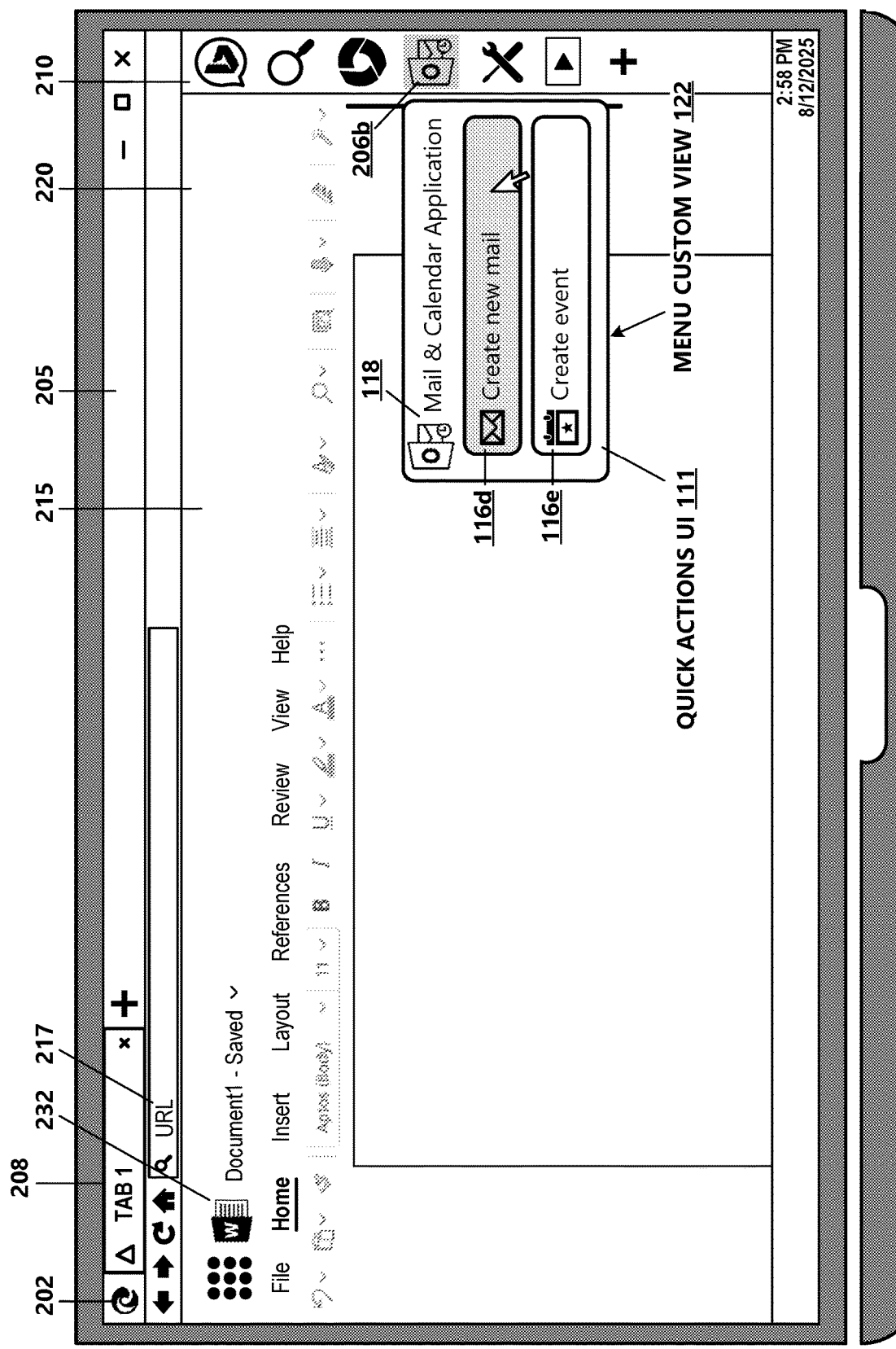
FIG. 2D is an illustration depicting a selection of a second quick action from a second example quick-actions card in accordance with examples of the present disclosure.
Figure 2E:
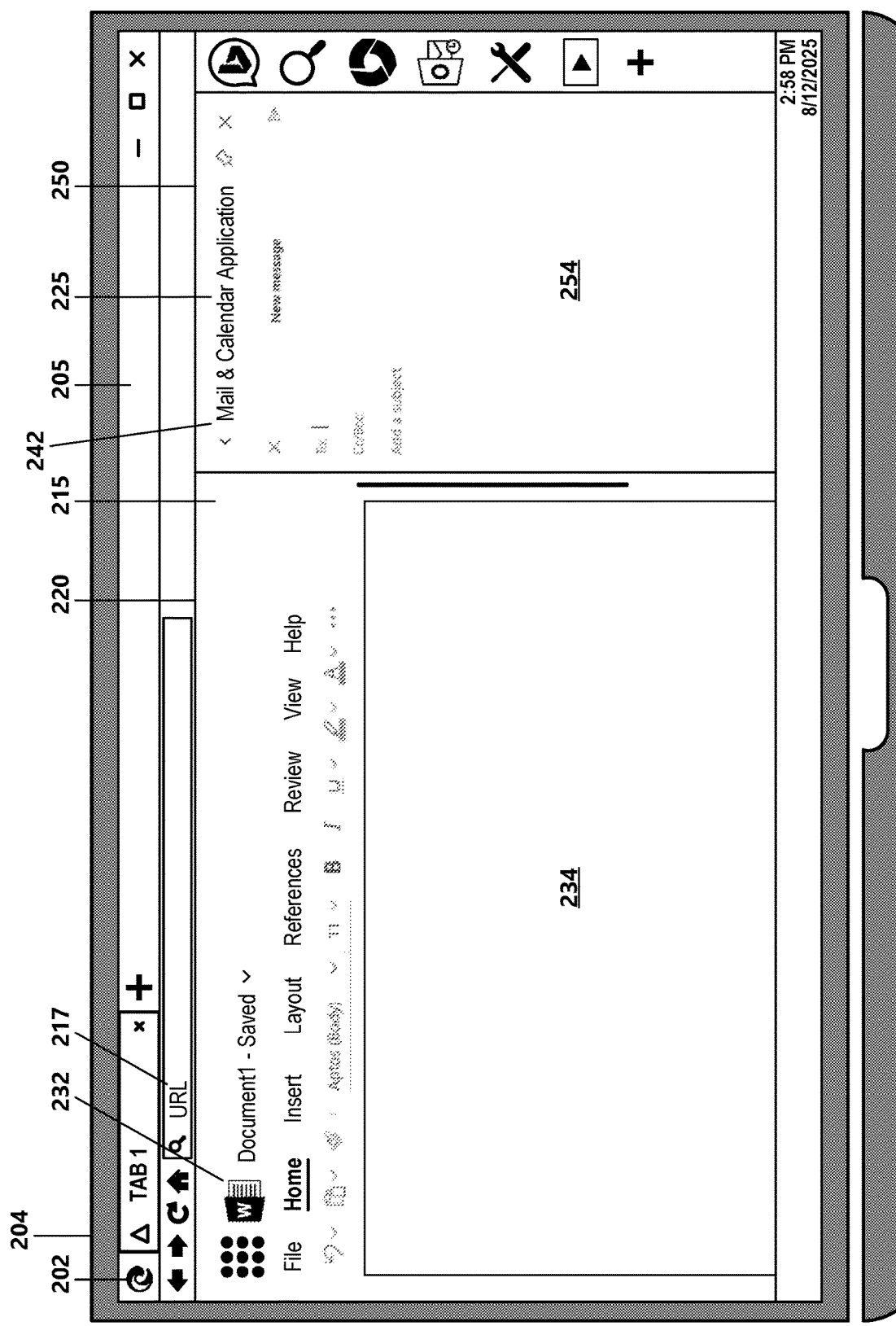
FIG. 2E is an illustration depicting another action performed in response to the selection of the second quick action in FIG. 2D in accordance with examples of the present disclosure.

Continuing with the example and with reference now to FIG. 2D, in response to a detection of a second hover event of a second icon 206b, dynamic quick actions 116d-116e corresponding to the application 118 of the second icon 206b are presented to the user on the screen 208. As an example, the second icon 206b corresponds to a mail and calendar application that provides functions 112 for managing emails, calendars, contacts, tasks, etc. In response to the hover selection of the second icon 206b, a corresponding quick-actions card 111 is generated and displayed. As depicted, a plurality of quick actions 116d-116e corresponding to executable actions for the mail and calendar application are populated in a quick-actions card 111 presented in the menu custom view 122, and a user selection of the fourth quick action 116d is made. In response to the selection, the web browser 202 performs the executable action 110 linked to the selected fourth quick action 116d. For instance, and with reference now to FIG. 2E, an application 118 (e.g., the mail and calendar application 242) associated with the fourth quick action 116d is opened and its associated UI (mail and calendar application UI 225) is displayed in the web browser UI 205.

In some examples, and as depicted in FIG. 2E, a selection of a quick action 116 causes the UI of the selected application 118 (e.g., mail and calendar application UI 225) to be displayed in a sidebar pane 250 that expands out from the sidebar 210. For instance, the fourth quick action 116d is associated with an event action, where in response to the selection, the web browser 202 executes code or instructions included in the executable action 110 bound to the fourth quick action 116d. In some examples, each executable action 110 is bound to one or more event handlers in the application 118 that are called in response to a selection of the corresponding quick action 116. When executed by the web browser 202, a communication is transmitted to the application 118 that triggers the application 118 to perform operations that handle the quick action 116. As an example, the executable action 110 bound to the fourth quick action 116d may cause the web browser 202 to construct and send an API request that includes instructions (e.g., an API endpoint and associated parameters) that the application 118 is configured to process and perform operations to provide one or more application functions 112 (e.g., wake up the mail and calendar application 242, create a new email 254). As depicted in FIG. 2E, the new email 254 is displayed in the mail and calendar application UI 225, which is displayed in the sidebar pane 250. The user can interact with the mail and calendar application 242 while using the web browser 202 to perform other tasks on the computing device 204, such as composing the new word processing document 234 displayed in the primary display area 220 of the web browser UI 205. In some examples, the sidebar pane 250 is located to a side of the primary display area 220 and activation of the sidebar pane 250 causes the primary display area 220 to shrink such that the sidebar pane 250 does not occlude content (e.g., the webpage serving the word processing application UI 215) displayed in the primary display area 220. In other examples, the sidebar pane 250 is provided as an overlay in front at least a portion of the primary display area 220.

Figure 2F:
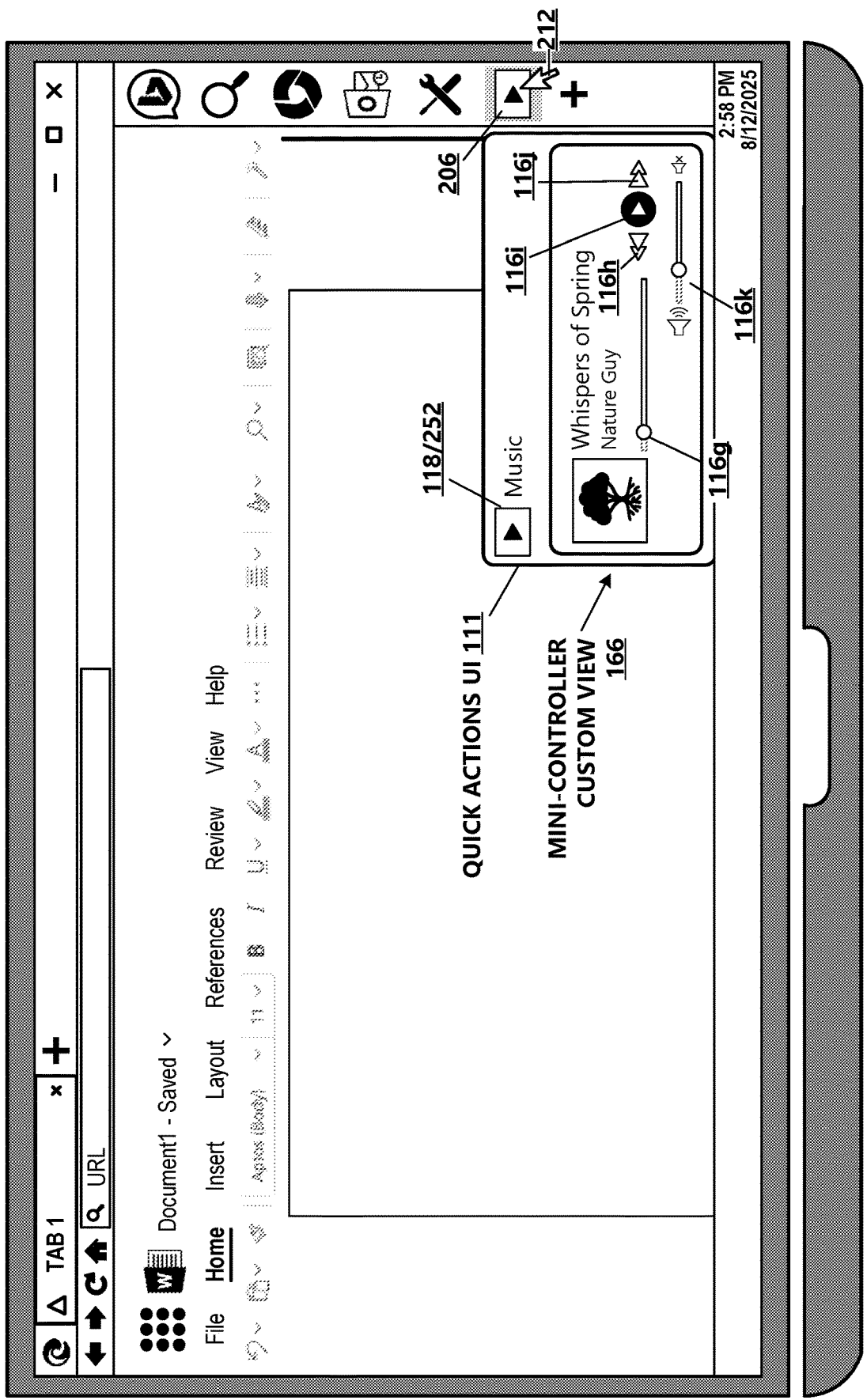
FIG. 2F is an illustration depicting a third example quick-actions card presented in a mini-controller custom view in accordance with examples of the present disclosure.

In further examples, and with reference now to FIG. 2F, the quick-actions card 111 is sometimes displayed in a mini-controller custom view 166. In the mini-controller custom view 166, a set of quick actions 116g-k (collectively, quick actions 116) are presented as selectable controls that allow the user to control audio and/or video playback functions 112 of a corresponding application 118. The mini-controller custom view 166 is used for applications 118, such as media player applications 252, where the user can select a quick action 116 to control play of audio and/or video content quickly without requiring multiple user interactions to open the media player application 252 and then select controls. In examples, the set of quick actions 116g-k in the mini-controller custom view 166 are bound to a set of event actions, where a selection of a quick action in the set causes the web browser 202 to execute the executable action 110 linked to the selected quick action. For instance, the event actions may correspond to controlling playing, pausing, stopping, skipping forward and backward, volume, shuffle and repeat options, content selection, and/or other functions 112 of the media player application 252. In some examples, the media player application 252 includes an event handler that is programmed to handle a trigger received in response to the executable action 110 being executed by the web browser 202.

Figure 3:
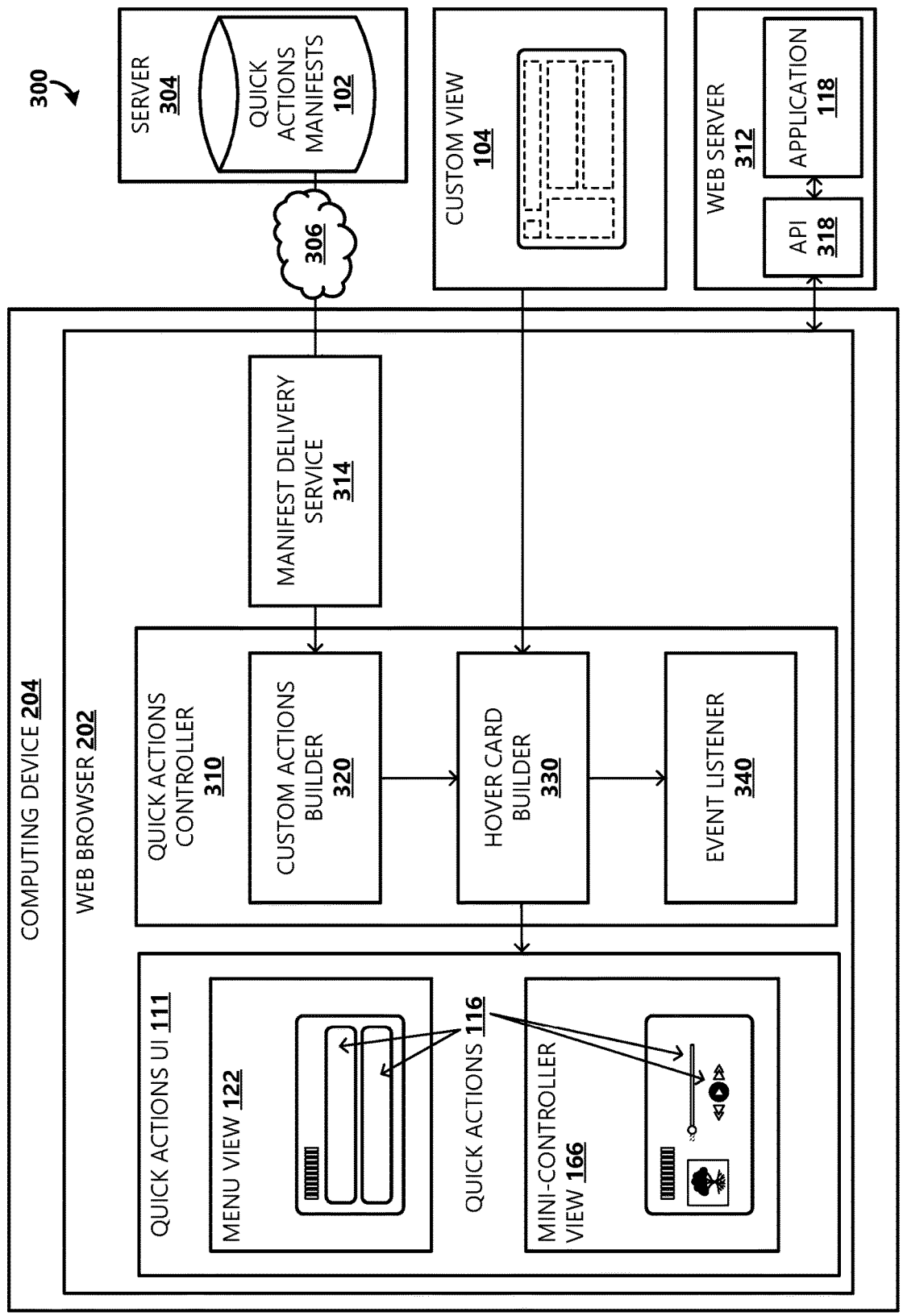
FIG. 3 is an illustration showing an example system in which dynamically generating quick actions for an application is implemented in accordance with examples of the present disclosure.

Having described illustrative examples of the quick-actions card 111, FIG. 3 depicts an example system 300 for dynamically generating quick actions 116 for an application 118 in a web browser 202. The web browser 202 executes on a client computing device 204. Examples of client computing devices 204 include personal computers (PCs), mobile devices (e.g., smartphones, tablets, laptops, personal digital assistants (PDAs)), wearable devices (e.g., smart watches, smart eyewear, fitness trackers, smart clothing, body-mounted devices, head-mounted displays), gaming consoles or devices, Internet of Things (IoT) devices, etc. The web browser 202 includes web browsing and display functionalities that control retrieval and display of webpages from remote sources, such as web servers 312. One or more web servers 312 provide one or more web-based applications 118 that can be accessed by and controlled via interactions with the web browser 202. The web browser 202 further includes a quick actions controller 310 that controls registration of quick actions 116 and the generation and display of the quick actions 116 in a quick-actions card 111. The quick actions controller 310 is a set or subset of computing code that causes or controls some of the operations discussed herein relating to generating dynamic quick actions 116 for display in a quick-actions card 111 in the web browser 202.

In examples, the quick actions controller 310 controls the display of the quick actions 116 through the use of configuration data included in a quick-actions manifest 102. The quick-actions manifest 102 is a file or set of code, such as a JavaScript Object Notation (JSON) data, that defines a configuration of the quick-actions card 111 for an application 118 and the quick actions 116 to display in the quick-actions card 111. For instance, the quick-actions manifest 102 may be provided by a developer feature team project manager of the application 118 and received by a server 304. The server 304 stores, manages, and distributes quick-actions manifests 102. In some examples, the web server 304 receives and distributes a quick-actions manifest 102 to a manifest delivery service 314 and/or client computing devices 204 via a content delivery network 306 within a minimal time period. For instance, the quick-actions manifest 102 may be pushed to the devices automatically or as part of a scheduled batch update process.

In examples, the configuration information in the quick-actions manifest 102 specifies a custom view 104 (e.g., menu custom view 122 or the mini-controller custom view 166) that defines a structure and style of the quick-actions card 111 for the application 118 and the quick actions 116 presented in the quick-actions card 111. In examples, the specified custom view 104 provides a consistent structure for organizing and displaying quick actions 116. For instance, the custom view 104 includes placeholders for various UI elements 108, such as buttons, text fields, sliders, toggle switches, dropdown lists, labels, progress indicators, icons, status indicators, etc. One or more UI elements 108 in the specified custom view 104 are mapped to one or more defined quick actions 116 and operate as interactive elements via which the user can interact with functions 112 of the corresponding application 118.

Each quick action 116 in the quick-actions manifest 102 defines an executable action 110 that specifies a behavior that the web browser 202 performs in response to a selection of an associated UI element 108. Such executable actions 110 further cause the application 118 to perform a desired application function 112. As discussed above, example executable actions 110 include URL actions and event actions. Thus, in some examples, the quick-actions manifest 102 specifies a URL 217 that the web browser 202 navigates to when executing a corresponding URL action. In other examples, when the executable action is an event action, the quick-actions manifest specifies an event handler that is triggered when the UI element 108 associated with the quick action 116 is selected.

In an example implementation, the system 300 includes an API 318 defining a set of rules and protocols that allow the web browser 202 to communicate and interact with the application 118. When the event action is triggered, the event handler initiates an API request to the API 318, which processes the request and communicates instructions to the application 118 to perform specific operations to perform a requested application function 112. In some examples, the API 318 includes a set of endpoints, which define the available operations of the application 118 and the associated request/response formats.

In examples, the manifests 102 are handled or managed by a manifest delivery service 314. For instance, the manifest delivery service 314 provides one or more manifests 102 to the web browser 202, where the quick actions controller 310 then manages the manifests 102 and corresponding quick action cards 111. In an example, the manifest delivery service 314 is called by the web browser 202 to retrieve a manifest 102 for a particular application 118.

In an example implementation, the quick actions controller 310 includes a custom actions builder 320, a hover card builder 330, and an event listener 340 that operate to consume the manifests 102 and generate custom quick-actions cards 111 for corresponding applications 118 included in the sidebar 210. The custom actions builder 320 receives a manifest 102 fetched from the server 304, parses the manifest 102, and compiles quick action configurations included in the manifest 102 into executable actions 110 (e.g., URL actions and/or event actions) that can be executed by the web browser 202 to control functions 112 of an application 118.

The event listener 340 monitors user interactions to determine whether to display or close the quick-actions card 111. One example user interaction the event listener 340 listens for is a "cursor enter", where the on-screen cursor 212 is detected within boundaries 213 of an application icon 206 in the sidebar 210. When the cursor 212 is monitored within the boundaries 213 of an application icon 206, the event listener 340 starts a timer. In examples, the cursor 212 within the boundaries 213 of the application icon 206 for at least a time threshold (e.g., 600 ms) without a selection of the application icon 206 (e.g., via a mouse click or tap on a touchscreen), triggers a hover event. When a hover event is triggered determined, the event listener 340 notifies the hover card builder 330 to display a quick-actions card 111 for the application 118 near the application icon 206. In an example implementation, the hover card builder 330 binds executable actions defined in the quick-actions manifest 102 to a specified custom view 104 (e.g., the menu custom view 122 or the mini-controller custom view 166) to generate a quick-actions card 111 for display according to information received from the event listener 340.

In some examples, binding the executable actions 110 to the custom view 104 triggers a data request to the application 118 for retrieving application information for generating the quick-actions card 111. For instance, one or more quick actions 116 defined in a quick-actions manifest 102 may be dynamic and present information that is updated to display real-time or live data to the user based on updates provided by the application 118. As an example, a first dynamic quick action 116 for a media player application 118 displayed in the mini-controller custom view 166 may include information about a current or next song in the user's music playlist and a second dynamic quick action 116 may include a slider to visually represent a current time position in the song. The information about the current or next song and the current time position is retrieved from the application 118 for updating the display of the UI elements of the first and second quick actions 116 in the quick-actions card 111.

In a further example, a dynamic quick action 116 is personalized to a user. For instance, a quick action 116 for an application 118 that is dynamic may be linked to a function 112 of the application 118 frequently used by the user, where information about frequently used functions 112 is retrieved from the application 118 and used to determine particular quick actions 116 to include in a quick-actions card 111. As an example, the user may use a game application 118 to play two particular games of a plurality of games. Thus, when binding the executable actions 110 to a custom view 104 to generate a quick-actions card 111, the hover card builder 330 may request a list of a top number of games (e.g., 2) most frequently used by the user, and then populate the quick-actions card 111 with two quick actions 116 corresponding to the two particular games. As another example, a dynamic quick action 116 may be generated for responding to a recently-received communication, opening a recently-edited document, accepting or declining a recently-received calendar invitation, etc.

Another example user interaction the event listener 340 listens for is a "cursor exit," where the cursor 212 is monitored outside the boundaries 213 of the hovered-on application icon 206 or quick-actions card 111. When the cursor 212 is monitored outside the boundaries 213 of the hovered-on application icon 206 or quick-actions card 111, the event listener 340 notifies the hover card builder 330 to close the displayed quick-actions card 111.

In further examples, the event listener 340 listens for a selection user interaction, where an event representing a user selection (e.g., a mouse click, a touch input on a touchscreen) made via a user input device 233 is received by the event listener 340. For instance, the event includes information about the selection, including coordinates of the cursor 212 on the screen 208. When a selection of a quick action 116 is detected, the event listener 340 notifies the web browser 202 to perform the executable action 110 linked to the selected quick action 116.

Figure 4:
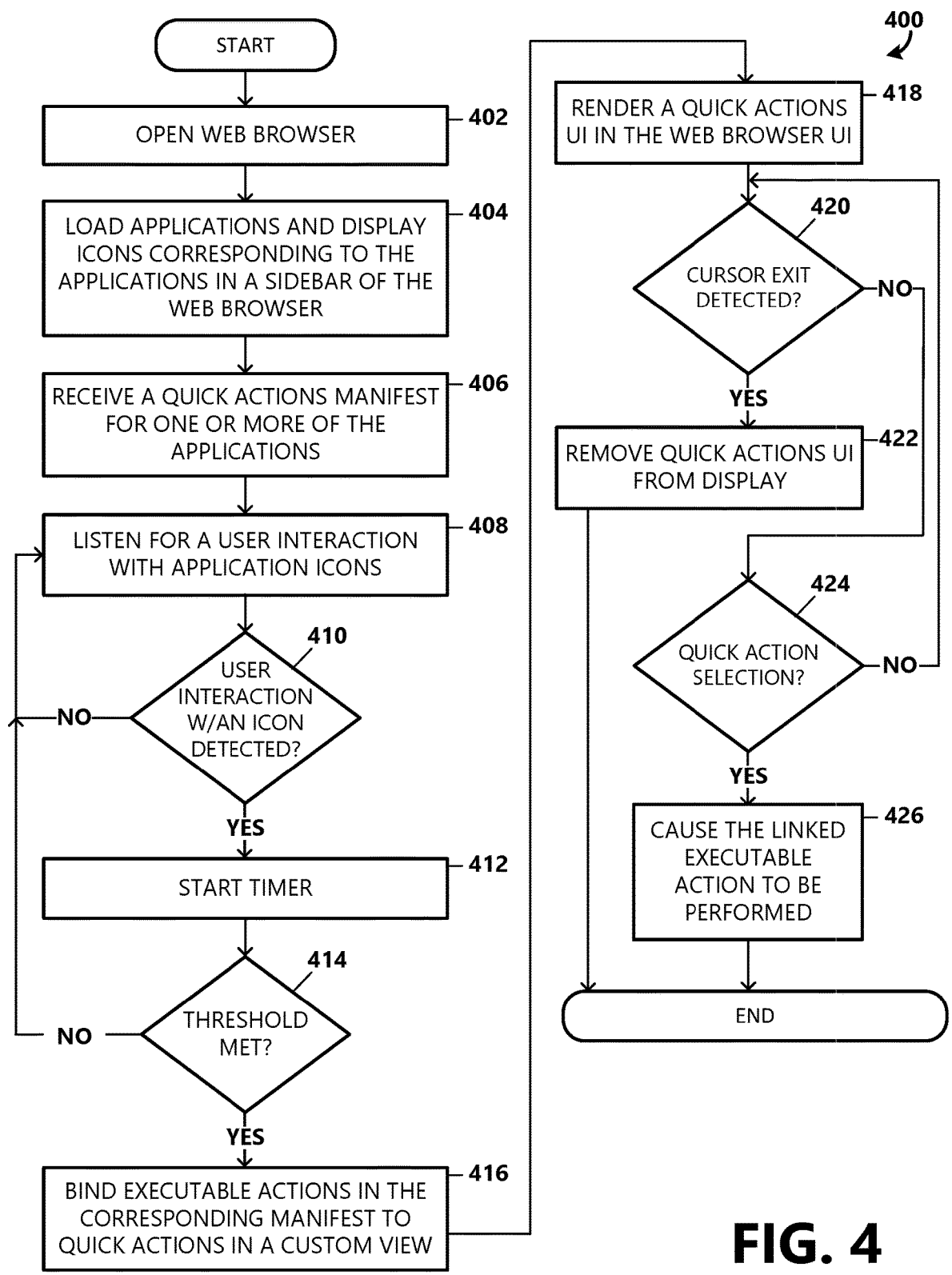
FIG. 4 is a flow diagram depicting an example method of dynamically generating quick actions for an application in accordance with examples of the present disclosure.

FIG. 4 depicts an example method 400 for dynamically generating quick actions 116 for an application 118 in accordance with examples of the present disclosure. The operations of method 400 may be performed by the web browser 202 or the computing device 204 on which the web browser 202 operates. For instance, some operations of the method 400 are performed by the quick actions controller 310 or the manifest delivery service 314. At operation 402, a web browser 202 is launched or executed. For instance, the web browser 202 is opened in response to a user selection of the web browser 202.

At operation 404, one or more applications 118 registered with the web browser 202 and/or profile of the user signed into the web browser 202 are loaded by the web browser 202. In some examples, loading the applications 118 includes receiving a list of applications 118 and their respective application manifests from a manifest delivery service (e.g., manifest delivery service 314 or another manifest delivery service). Operation 404 further includes updating the web browser UI 205 based on the loaded applications 118. For instance, application icons 206 corresponding to the applications 118 are displayed in the sidebar 210 of the web browser 202.

At operation 406, a quick-actions manifest 102 for each of the one or more registered applications 118 is received. In some implementations, operation 406 may be included in operation 404, where the quick-actions manifests 102 are retrieved when the application manifests are received. Each received quick-actions manifest 102 includes configuration data for quick actions 116 as discussed above. For instance, the configuration information defines a custom view 104 for presenting the quick actions 116 in a quick-actions card 111 and an executable action 110 linked to each quick action 116.

At operation 408, the event listener 340 listens for a user interaction with an application icon 206 of an application 118 presented in the sidebar 210. At decision operation 410, a determination is made as to whether a "cursor enter" user interaction with an application icon 206 is detected. For instance, when the user moves the cursor 212 within boundaries 213 of an application icon 206 in the sidebar 210 and a "cursor enter" user interaction is detected, the method 400 proceeds to operation 412, where a timer is started. If a "cursor enter" user interaction with an application icon 206 is not detected, the event listener 340 returns to operation 408, where it continues to listen for another user interaction event.

At decision operation 414, a determination is made as to whether a time threshold is met, triggering a hover event. For instance, when the user's pointer 212 is within the boundaries 213 of the application icon 206 for at least the time threshold without receiving a selection of the application icon 206, a hover event with the application icon 206 is determined. When the time threshold is met and a hover interaction is determined, the method 400 proceeds to operation 416. When the time threshold is not met, the method 400 returns to operation 408.

At operation 416, a quick-actions card 111 is generated, where the hover card builder 330 binds executable actions 110 corresponding to a set of quick actions 116 defined in the corresponding quick-actions manifest 102 to UI elements 108 provided in a specified custom view 104. For instance, the quick-actions manifest 102 specifies a menu custom view 122 or a mini-controller custom view 166 for the quick-actions card 111, executable actions 110, and other configuration properties of the quick actions 116. In some examples, the executable actions 110 are URL actions and/or event actions. In some implementations, information is obtained from the application 118 for generating a quick action 116. For instance, the quick action 116 can be dynamic and linked to live application information, where current application information is requested from the application 118 and used to determine which quick actions 116 are included in the quick-actions card 111 and/or display properties of the quick actions 116 in the quick-actions card 111.

At operation 418 the hover card builder 330 renders a quick-actions card 111 in the web browser UI 205 including UI elements 108 representative of the quick actions 116 defined in the quick-actions manifest 102. The quick actions 116 are presented as selectable UI elements according to the custom view 104 defined in the quick-actions manifest 102. For instance, the quick-actions card 111 may be presented in a menu custom view 122 or in a mini-controller custom view 166, displaying various selectable quick actions 116 that are linked to various application functions 112.

At decision operation 420, a determination is made as to whether a "cursor exit" user interaction with the application icon 206 or quick-actions card 111 is detected. For instance, when the user moves the cursor 212 outside the boundaries 213 of the application icon 206 or the quick-actions card 111, a "cursor exit" user interaction is detected and the method 400 proceeds to operation 422. At operation 422, the quick-actions card 111 is removed from display.

When a "cursor exit" user interaction with the application icon 206 or quick-actions card 111 is not detected, the method 400 proceeds to decision operation 424, where a determination is made as to whether a selection of a quick action 116 is received. When a selection of a quick action 116 is not received, the method 400 returns to decision operation 420 to determine whether a "cursor exit" user interaction with the application icon 206 or quick-actions card 111 is detected. Alternatively, when a determination is made that a selection of a quick action 116 is received, the method 400 proceeds to operation 426, where the executable action 110 bound to the selected quick action 116 is executed by the web browser 202. For instance, when the executable action 110 is a URL action, the web browser 202 navigates to a specified URL 217 associated with the application 118 and the webpage corresponding to the specified URL 217 is displayed in the primary display area 220 of the web browser UI 205. When the executable action 110 is an event action, an event handler is triggered that causes the web browser 202 to initiate an API request that communicates instructions to the application 118 to perform specific operations that provide an application function 112 corresponding to the selected quick action 116. For instance, the application 118 may open a new document, create a new message, create a new calendar event, respond to a message or calendar invitation, open a specific document, control playback of a media content item, or another application function 112. In some examples, responsive to an event action, the web browser 202 opens a sidebar pane 250 and serves a UI of the application 118 in the sidebar pane 250 with which the user can interact with the application 118 through the web browser 202.

Figure 5:
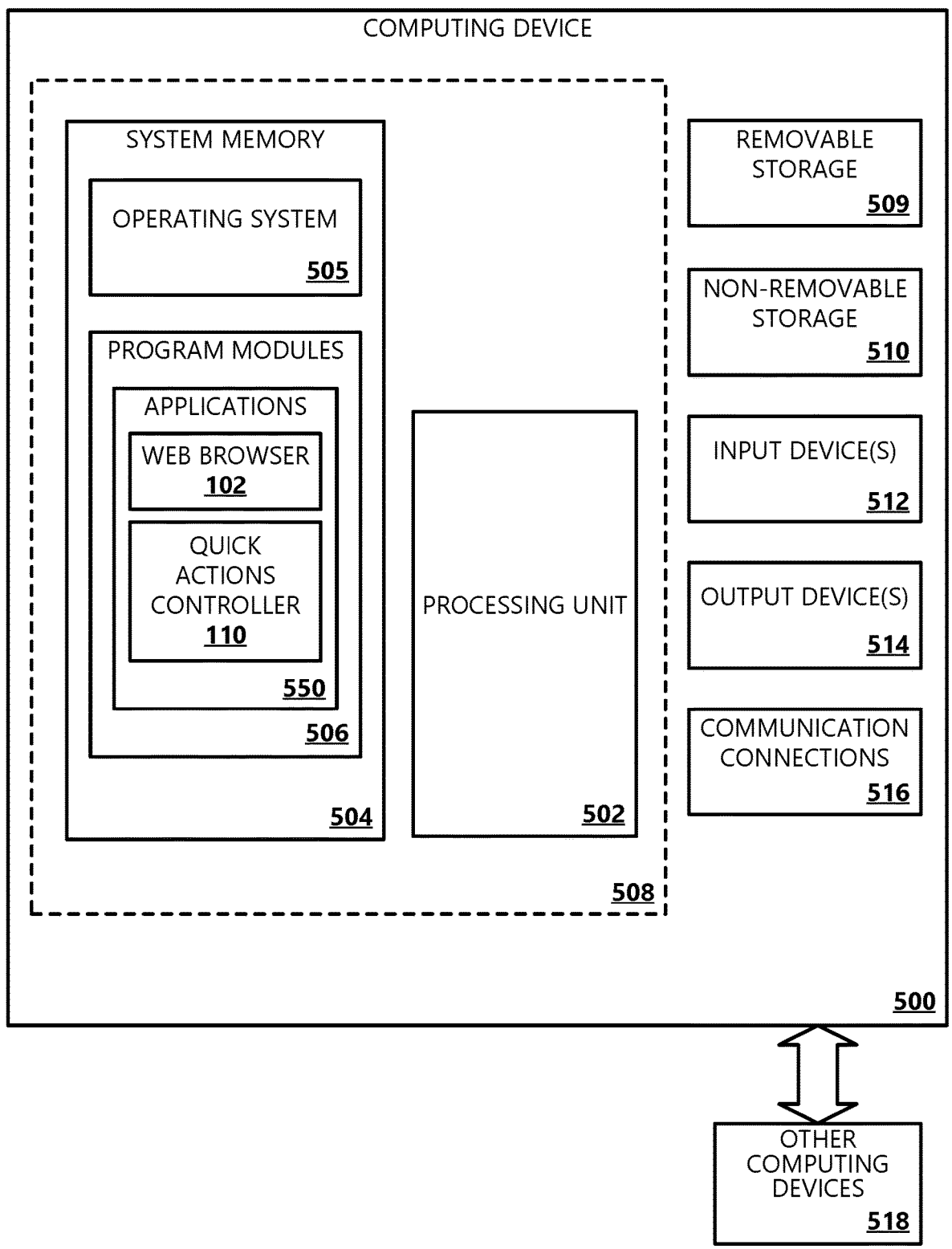
FIG. 5 is a block diagram illustrating example physical components of a computing device with which aspects of the disclosure may be practiced.

FIG. 5 and the associated description provide a discussion of a variety of operating environments in which examples of the invention may be practiced. However, the devices and systems illustrated and discussed with respect to FIG. 5 is for purposes of example and illustration and is not limiting of a vast number of computing device configurations that may be utilized for practicing aspects of the invention, described herein. FIG. 5 is a block diagram illustrating physical components (i.e., hardware) of a computing device 500 with which examples of the present disclosure may be practiced. The computing device components described below may be suitable for a client device running the web browser discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 550 (e.g., a web browser 202 and a quick actions controller 310).

The operating system 505, for example, may be suitable for controlling the operation of the computing device 500.

Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or function. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the operations of the method illustrated in FIG. 4. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In an aspect, the technology relates to a computing system for generating dynamic quick actions for an application, the computing system comprising: at least one processor; and memory storing instructions that, when executed by the at least one processor, cause the computing system to: display an icon for an application in a sidebar of a web browser; detect a hover event in association with the icon; bind an executable action to a user interface element based on configuration information received in a quick-actions manifest for the application; display the user interface element representative of a quick action in a quick-actions card near the icon; receive a selection of the user interface element; and execute the executable action bound to the selected user interface element for performing a function of the application corresponding to the represented quick action.

In some examples, the executable action is a uniform resource locator (URL) action including executable code for navigating to a specified URL of a webpage. In further examples, the executable action is an event action including executable code for instructing the application to perform operations that cause the function to be performed. In still further examples, the executable action is an event action, and the instructions cause the system to make an application programming interface (API) call to an API of the application. In yet further examples, the instructions cause the system to open and serve a user interface of the application in a sidebar pane of the web browser. In still yet further examples, the instructions further cause the system to: retrieve information from the application; and perform at least one of: present the retrieved information in the quick-actions card; or use the retrieved information to determine display properties of the user interface element representative of the quick action. In yet further examples, the instructions further cause the system to receive the quick-actions manifest, where the quick-actions manifest defines a plurality of quick actions corresponding to a plurality of functions of the application.

In an aspect, the technology relates to a computer-implemented method for generating dynamic quick actions for an application, comprising: receiving a quick-actions manifest defining a quick action corresponding to a function of an application, where the application is represented by an icon in a sidebar of a web browser; detecting a hover event in association with the icon; binding an executable action defined in the quick-actions manifest to a user interface element representative of the quick action in a quick-actions card; causing a display of the quick-actions card and the user interface element; receiving a selection of the user interface element; and executing the executable action bound to the selected user interface element and causing the function of the application.

In some examples, prior to binding the executing action to the user interface element comprises loading a custom view of the quick-actions card, where the custom view is specified in the quick-actions manifest. In additional examples, loading the custom view comprises loading a menu custom view or a mini-controller custom view. In further examples, binding the executable action defined in the quick-actions manifest to the user interface element comprises binding a uniform resource locator (URL) action to the user interface element, wherein the URL action includes a URL of a webpage. In yet further examples, executing the executable action bound to the selected user interface element comprise navigating to the webpage of the URL included in the URL action. In still yet further examples, binding the executable action defined in the quick-actions manifest to the user interface element comprises binding an event action to the user interface element, wherein the event action includes executable code for performing the function of the application. In yet further examples, executing the executable action comprises executing the executable code. In still yet further examples, executing the executable code comprises initiating an application programming interface (API) request that is communicated to the application to instruct the application to perform the function of the application. In yet further examples, executing the executable action comprises causing the application to open and serving a user interface of the application in a sidebar pane of the web browser. In still yet further examples, causing the display of the quick-actions card and the user interface elements comprises: retrieving information from the application; and presenting the retrieved information in the quick-actions card; or using the retrieved information to determine display properties of the quick action. In yet further examples, the quick-actions manifest defines a plurality of quick actions corresponding to a plurality of functions of the application; and causing the display of the quick-actions card and the user interface element comprises: retrieving information from the application; and using the retrieved information to determine one or more of the plurality of quick actions to include in the quick-actions card.

In an aspect, the technology relates to a computer-implemented method for generating dynamic quick actions for an application, comprising: displaying a sidebar within a web browser; displaying, in the sidebar, an icon for an application; receiving a quick-actions manifest for the application including configuration information for a quick action associated with a function of the application; detecting a hover event in association with the icon; applying the configuration information for the quick action to a custom view of a quick-actions card; binding an executable action included in the configuration information to a user interface element in the custom view; displaying the quick-actions card including the user interface element near the icon; receiving a selection of the user interface element; and executing the executable action for performing the function of the application. In some examples, the executable action is an event action including executable code for instructing the application to perform operations that cause the application to open and serve a user interface of the application in a sidebar pane of the web browser.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

We claim:

1. A computing system for generating dynamic quick actions for an application, the computing system comprising:
   at least one processor; and
   memory storing instructions that, when executed by the at least one processor, cause the computing system to:
      display an icon for a web-based application in a sidebar of a web browser;
      detect a hover event in association with the icon;
      in response to detecting the hover event:
         obtain a quick-actions manifest for the application, the quick-actions manifest comprising configuration information indicating a plurality of executable actions for performing a plurality of functions of the web-based application, and
         display a plurality of user interface elements representative of the plurality of executable actions in a quick-actions card near the icon;
      receive a selection of a first user interface element of the plurality of user interface elements; and
      execute a first executable action of the plurality of executable actions.

2. The system of claim 1, wherein the first executable action is a uniform resource locator (URL) action including executable code for navigating to a specified URL of a webpage.

3. The system of claim 1, wherein the first executable action is an event action including executable code for instructing the web-based application to perform operations that cause the first executable action to be performed.

4. The system of claim 3, wherein the first executable action is an event action, and the executable code causes the system to make an application programming interface (API) call to an API of the application.

5. The system of claim 3, wherein the instructions cause the system to open and serve a user interface of the web-based application in a sidebar pane of the web browser.

6. The system of claim 1, wherein the instructions further cause the system to:
retrieve information from the web-based application; and
perform at least one of:
present the retrieved information in the quick-actions card; or
use the retrieved information to determine display properties of the plurality of user interface elements.

7. The system of claim 1, wherein the executable code further causes the system to receive the quick-actions manifest, where the quick-actions manifest defines a plurality of quick actions corresponding to the plurality of functions of the application.

8. A computer-implemented method for generating dynamic quick actions for a web-based application, comprising:
receiving a quick-actions manifest defining a plurality of quick actions corresponding a plurality of functions of the web-based application, where the web-based application is represented by an icon in a sidebar of a web browser;
detecting a hover event in association with the icon;
in response to detecting the hover event:
binding a plurality of executable actions defined in the quick-actions manifest to a plurality of user interface elements representative of the plurality of the plurality of quick actions in a quick-actions card, and
causing a display of the quick-actions card and the plurality of user interface elements;
receiving a selection of a first user interface element of the plurality of user interface elements; and
executing a first executable action of the plurality of executable actions bound to the first user interface element and causing a first function of the web-based application.

9. The method of claim 8, further comprising:
prior to binding the plurality of executable actions to the plurality of user interface elements, loading a custom view of the quick-actions card, where the custom view is specified in the quick-actions manifest.

10. The method of claim 9, wherein loading the custom view comprises loading a menu custom view or a mini-controller custom view.

11. The method of claim 8, wherein binding the plurality of executable actions defined in the quick-actions manifest to the plurality of user interface elements comprises binding a uniform resource locator (URL) action to the first user interface element, wherein the URL action includes a URL of a webpage.

12. The method of claim 11, wherein executing the first executable action bound to the first user interface element comprise navigating to the webpage of the URL included in the URL action.

13. The method of claim 8, wherein binding the first executable action defined in the quick-actions manifest to the first user interface element comprises binding an event action to the first user interface element, wherein the event action includes executable code for performing the first function of the application.

14. The method of claim 13, wherein executing the first executable action comprises executing the executable code.

15. The method of claim 14, wherein executing the executable code comprises initiating an application programming interface (API) request that is communicated to the application to instruct the application to perform the first function of the application.

16. The method of claim 15, wherein executing the first executable action comprises causing the web-based application to open and serve a user interface of the web-based application in a sidebar pane of the web browser.

17. The method of claim 8, wherein causing the display of the quick-actions card and the plurality of user interface elements comprises:
retrieving information from the web-based application; and
presenting the retrieved information in the quick-actions card; or
using the retrieved information to determine display properties of the quick action.

18. The method of claim 8, wherein:
the quick-actions manifest defines a plurality of quick actions corresponding to the plurality of functions of the web-based application; and
causing the display of the quick-actions card and the plurality of user interface elements comprises:
retrieving information from the web-based application; and
using the retrieved information to determine one or more of the plurality of quick actions to include in the quick-actions card.

19. A computer-implemented method for generating dynamic quick actions for a web-based application, comprising:
displaying a sidebar within a web browser;
displaying, in the sidebar, an icon for the web-based application;
receiving a quick-actions manifest for the web-based application including configuration information indicating a plurality of executable actions for performing a plurality of functions of the application;
detecting a hover event in association with the icon;
in response to detecting the hover event:
applying the configuration information for the quick action to a custom view of a quick-actions card,
binding the plurality of executable actions included in the configuration information to a plurality of user interface elements in the custom view, and
displaying the quick-actions card including the plurality of user interface elements near the icon;
receiving a selection of a first user interface element of the plurality of user interface elements; and
executing a first executable action for performing a first function of the web-based application.

20. The method of claim 19, wherein the first executable action is an event action including executable code for instructing the application to perform operations that cause the web-based application to open and serve a user interface of the web-based application in a sidebar pane of the web browser.

* * * * *